(12) United States Patent
Lang et al.

(10) Patent No.: US 7,805,990 B2
(45) Date of Patent: Oct. 5, 2010

(54) ARRANGEMENT OF AN AIR MASS METER AT A FLOW CHANNEL

(75) Inventors: Jürgen Lang, Benningen (DE); Eric Thebault, Ludwigsburg (DE); Robert Hasenfratz, Waiblingen (DE); Masayuki Kozawa, Hitachinaki (JP); Hiromu Kikawa, Hitachinaki (JP)

(73) Assignees: Mann + Hummel GmbH, Ludwigsburg (DE); Hitachi, Ltd., Tokyo-to (JP)

( * ) Notice: Subject to any disclaimer, the term of this patent is extended or adjusted under 35 U.S.C. 154(b) by 127 days.

(21) Appl. No.: 12/281,497

(22) PCT Filed: Feb. 24, 2007

(86) PCT No.: PCT/EP2007/001613

§ 371 (c)(1),
(2), (4) Date: Sep. 3, 2008

(87) PCT Pub. No.: WO2007/101570

PCT Pub. Date: Sep. 13, 2007

(65) Prior Publication Data

US 2009/0095069 A1    Apr. 16, 2009

(30) Foreign Application Priority Data

Mar. 3, 2006  (DE)  ........................ 10 2006 010 374

(51) Int. Cl.
*G01F 1/68* (2006.01)
(52) U.S. Cl. ..................................... 73/204.22; 73/273

(58) Field of Classification Search .................. None
See application file for complete search history.

(56) References Cited

U.S. PATENT DOCUMENTS

| | | | | |
|---|---|---|---|---|
| 3,498,320 | A * | 3/1970 | Hughes | 137/412 |
| 4,523,461 | A | 6/1985 | Watkins | |
| 4,553,433 | A * | 11/1985 | Hicks | 73/273 |
| 5,088,257 | A * | 2/1992 | Loga et al. | 52/204.591 |
| 5,099,699 | A * | 3/1992 | Kobold | 73/861.79 |
| 5,131,277 | A * | 7/1992 | Birdsong et al. | 73/861.05 |
| 5,297,717 | A * | 3/1994 | Parry | 228/55 |
| 5,369,990 | A | 12/1994 | Zurek et al. | |
| 5,383,356 | A * | 1/1995 | Zurek et al. | 73/114.33 |
| 6,038,927 | A * | 3/2000 | Karas | 73/706 |
| 6,805,002 | B2 * | 10/2004 | Yonezawa | 73/204.22 |
| 7,424,940 | B2 * | 9/2008 | Klopp et al. | 192/15 |
| 7,530,267 | B2 * | 5/2009 | Uramachi | 73/202.5 |
| 2004/0055375 | A1 * | 3/2004 | Zurek et al. | 73/204.12 |
| 2004/0129073 | A1 | 7/2004 | Saito et al. | |
| 2004/0134272 | A1 | 7/2004 | Pesahl et al. | |
| 2007/0068760 | A1 * | 3/2007 | Klopp et al. | 192/15 |

* cited by examiner

*Primary Examiner*—Harshad Patel
(74) *Attorney, Agent, or Firm*—Gudrun E. Huckett

(57) ABSTRACT

For arranging an air mass meter at a flow channel, the flow channel has a housing section with a flange surrounding a receiving opening for the air mass meter. The air mass meter has a socket with a contact surface that is facing the flange. Fasteners are provided that attach the socket on the housing section. The socket and the housing section have elements for positioning the air mass meter free of play relative to a flow direction of a fluid flow that is guided in the flow channel.

10 Claims, 5 Drawing Sheets

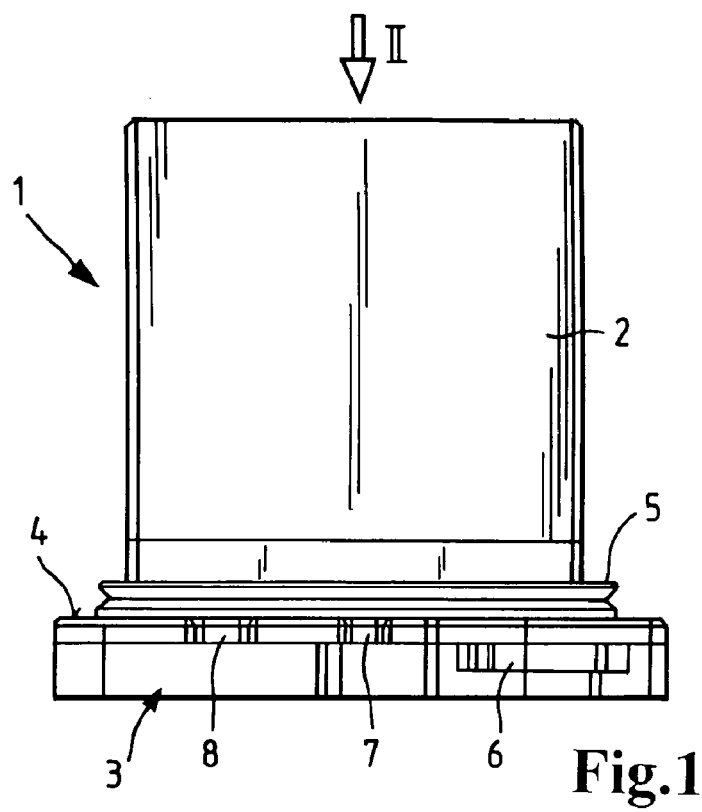
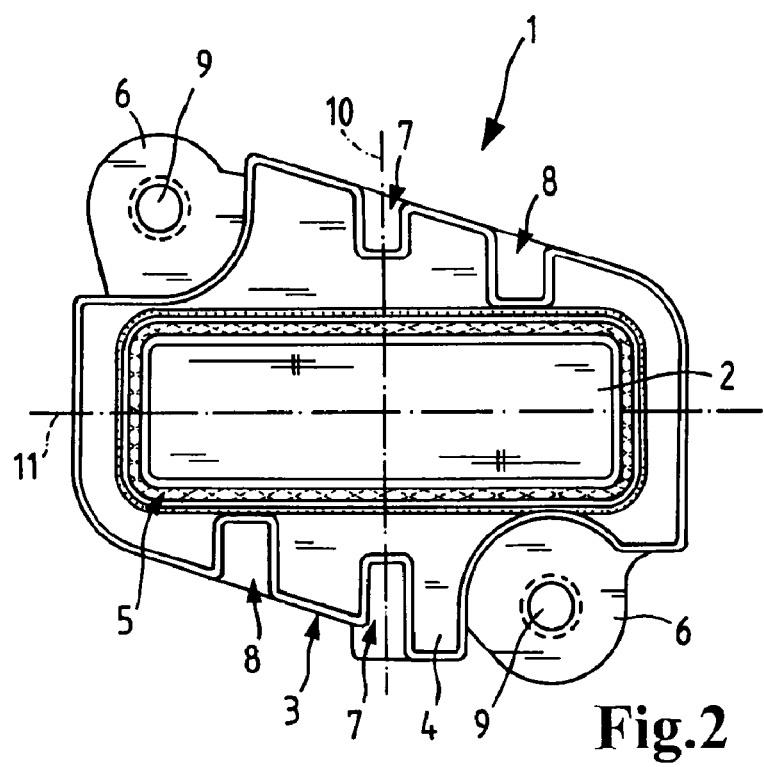

ARRANGEMENT OF AN AIR MASS METER AT A FLOW CHANNEL

BACKGROUND OF THE INVENTION

The invention concerns an arrangement of an air mass meter at a flow channel, wherein on a housing section of the flow channel a receiving opening for the air mass meter is provided and this opening is surrounded by a flange, wherein the air mass meter comprises a socket with a contact surface facing the flange, and wherein fastening means for attachment of the socket on the housing section are provided.

Air mass meters are used in connection with the motor control of vehicle engines. An air mass meter serves as a sensor for detecting the air mass that is taken in by the engine. The measured result of the sensor can however be affected by several factors, in particular also by the position relative to the direction of the mass flow. In the conventional arrangements that are currently employed, the air mass meter comprises a socket with a contact surface that rests on a flange on a housing section of the flow channel when the air mass meter is installed. The attachment is realized usually in that screws are pushed through bores provided on the socket and screwed into bores provided laterally relative to the flange. As a result of the tolerances that occur usually in connection with such attachment means, a certain range exists within which the position of the air mass meter deviates from the desired position of installation; this deviation has a noticeable effect on the measured result and thus on the provided sensor signal.

It is therefore an object of the invention to provide an arrangement of an air mass meter at a flow channel through which the position of the air mass meter can be precisely determined so that, in this way, the quality of the sensor signal can be significantly improved.

SUMMARY OF THE INVENTION

This object is solved by an arrangement of an air mass meter, wherein on the socket and the housing section means are provided for positioning the air mass meter free of play relative to the flow direction of the fluid flow that is guided in the flow channel.

By means of the arrangement according to the invention, the air mass meter is precisely positioned upon insertion into the receiving opening; this leads to significant quality improvements of the generated signal of the air mass meter. With this more precise signal the motor control is improved also and this, in turn, finally leads to improved exhaust gas values of the internal combustion engine. In connection with the present invention "free of play" means that the air mass meter during installation assumes a precisely defined position and then maintains this position.

According to a preferred embodiment, at least one centering pin, preferably however several centering pins, are provided as means for positioning free of play and engage centering openings of precise fit. Centering pins and centering openings can be produced with high precision but without great expenditure and have moreover the advantage that, upon installation of the air mass meter at the housing section of the flow channel, they engage one another automatically. For minimizing the components and reducing the manufacturing costs, it is expedient that the centering pins are formed monolithically on the outer edge of the flange of the receiving opening.

According to a further embodiment of the invention, the centering openings are formed on the contact surface of the socket wherein in particular the centering openings are formed as grooves that begin at the outer edge of the contact surface. In this way, only one precision fit of the centering openings is produced in the direction in which the defined position of the air mass meter is required and a sufficient play is provided in the transverse direction in order to avoid jamming of the parts that engage one another.

In order for the socket of the air mass meter to rest, in any case, reliably against the flange, it is expedient that the height by which the centering pin projects past the plane of the flange is smaller than the depth of the centering openings. For facilitating assembly, it is advantageous that the centering pins have an insertion cone at their leading end.

Particularly expedient is an arrangement in which two centering pins and two centering openings are provided. When the receiving opening or the flange has an elongate shape, an arrangement is possible in which the centering pins are located at least approximately at the center of the longitudinal extension. For a particularly precise positioning of the air mass meter it is advantageous that the receiving opening or the flange has an elongate shape and the centering pins are arranged at a significant spacing, preferably a spacing as large as possible, relative to a transverse axis. In addition to the exact positioning of the air mass meter, relative to the flow direction, additional means for precisely fixing the insertion depth of the air mass meter in the flow channel can be provided.

BRIEF DESCRIPTION OF THE DRAWINGS

Several embodiments of the arrangement according to the invention of the air mass meter at a flow channel will be explained in more detail in the following with the aid of the drawing. The drawing shows in:

FIG. 1 a view of the air mass meter with sensor housing and socket;

FIG. 2 a view in the direction of arrow 11 in FIG. 1;

DESCRIPTION OF PREFERRED EMBODIMENTS

Figure 4:
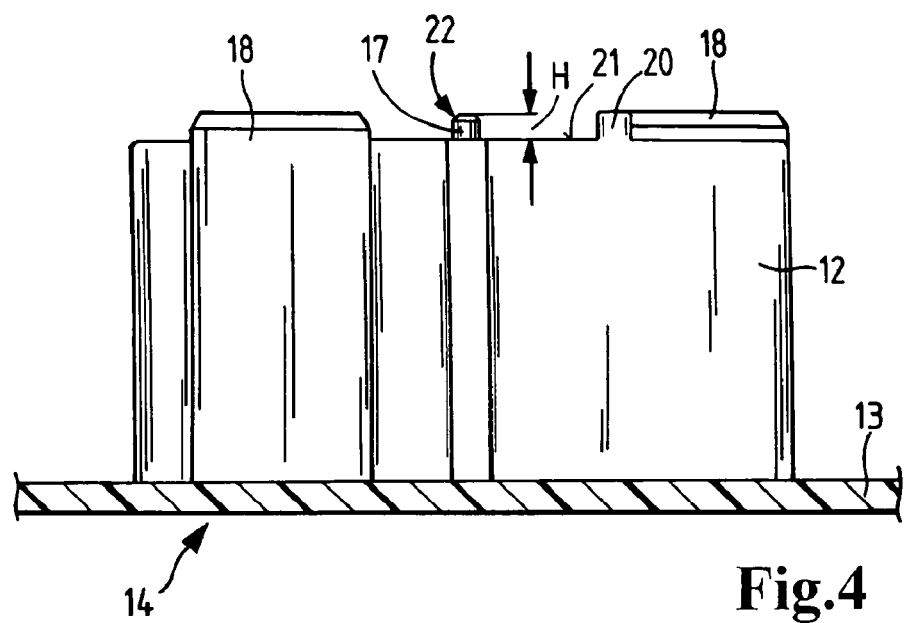
FIG. 4 a section along the line IV-IV in FIG. 3.

In FIG. 1 an air mass meter 1 is illustrated that comprises a sensor housing 2 and a socket 3. On the side adjacent to the sensor housing 2, the socket 3 is provided with a contact surface 4 that has a circumferentially extending collar 5 surrounding the sensor housing 2.

FIG. 2 shows a view in the direction of arrow 11 in FIG. 1 so that the air mass meter 1 is shown in a view onto the contact surface 4 on the socket 3. The reference numeral 2, as in FIG. 1, identifies the sensor housing. As can be seen in FIGS. 1 and 2, on the socket 3 there are tabs 6 with bores 9 that are provided for receiving fastening screws, not illustrated in the drawing. Centering openings 7 are arranged on the socket 3 on the side of the contact surface 4 and, according to the illustration of FIG. 2, are embodied as grooves beginning at the edge of the socket 3. In this connection, the centering openings 7 are positioned opposite one another along a transverse axis 10 of the air mass meter 1. The transverse axis 10 extends orthogonally to a longitudinal axis 11 of the air mass meter 1 wherein the longitudinal axis 11 is to be aligned as precisely as possible to the flow direction of the fluid. On the socket 3 there are also two recesses 8 provided on its contact surface 4; they are also embodied as open grooves extending from the edge of the socket 3 in the direction toward the circumferentially extending collar 5. The function of the centering openings 7 and recesses 8 will be explained in the following in more detail.

Figure 3:
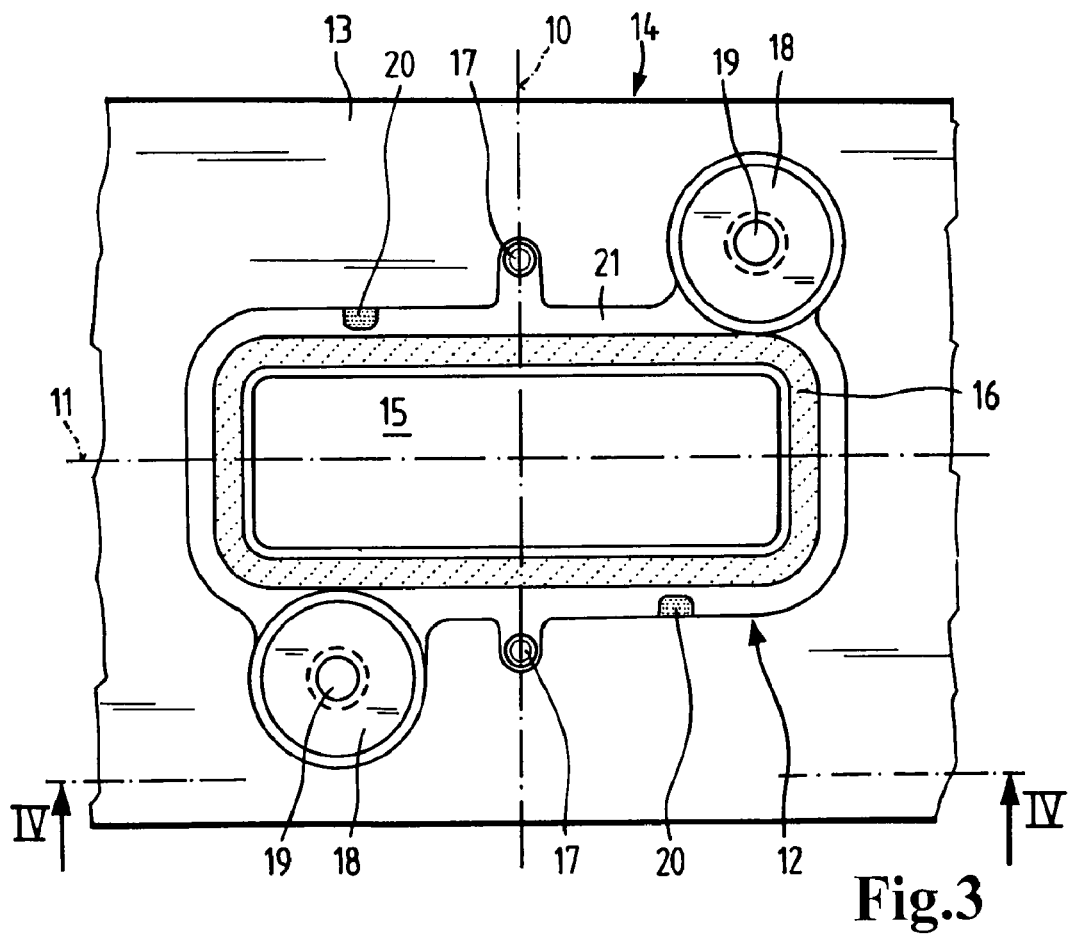
FIG. 3 a plan view onto a flange surrounding the receiving opening at a housing section of the flow channel.

FIG. 3 shows a plan view onto a flange 12 that is formed on a housing section 13 of a flow channel 14 and surrounds a receiving opening 15 for the air mass meter according to FIGS. 1 and 2. On the flange 12 there is a circumferentially extending recess 16 that serves for receiving the circumferentially extending collar 5 of the socket 3 of the air mass meter 1 (compare FIGS. 1 and 2). As can be seen in FIGS. 2 and 3, the receiving opening 15 as well as the air mass meter, or its housing 2, to be inserted therein have an elongate shape so that the receiving opening 15 has also a longitudinal axis 11 and a transverse axis 10.

At the center of the longitudinal extension of the receiving opening 15 and thus on the transverse axis 10, two centering pins 17 are provided at the edge of the flange 12; they are formed as monolithic parts of the flange 12 on its edge. FIG. 3 also shows that two cylindrically shaped socket elements 18 are formed that adjoin the flange 12 and that have a threaded bore 19, respectively. The threaded bores 19 serve for receiving fastening screws that are pushed through the bores 9 in the tabs 6 (compare FIG. 2) and then are screwed into the threaded bore 19. Laterally adjacent to the centering pins 17, a pin 20 is provided on the flange 12 at an appropriate spacing, respectively.

In place of the attachment by means of screws with metric thread, self-tapping screws can be used also so that the thread in the bores can be eliminated.

FIG. 4 shows a section along the line IV-IV in FIG. 3. This drawing shows that the flange 12 has a plane 21 and that the socket elements 18 as well as the centering pins 17 and the pins 20 project past the plane 21. The height at which the centering pin 17 projects past the plane 21 of the flange 12 is identified at H. FIG. 4 also shows that the centering pin 17 has an insertion cone 22 at its leading end.

Figure 5:
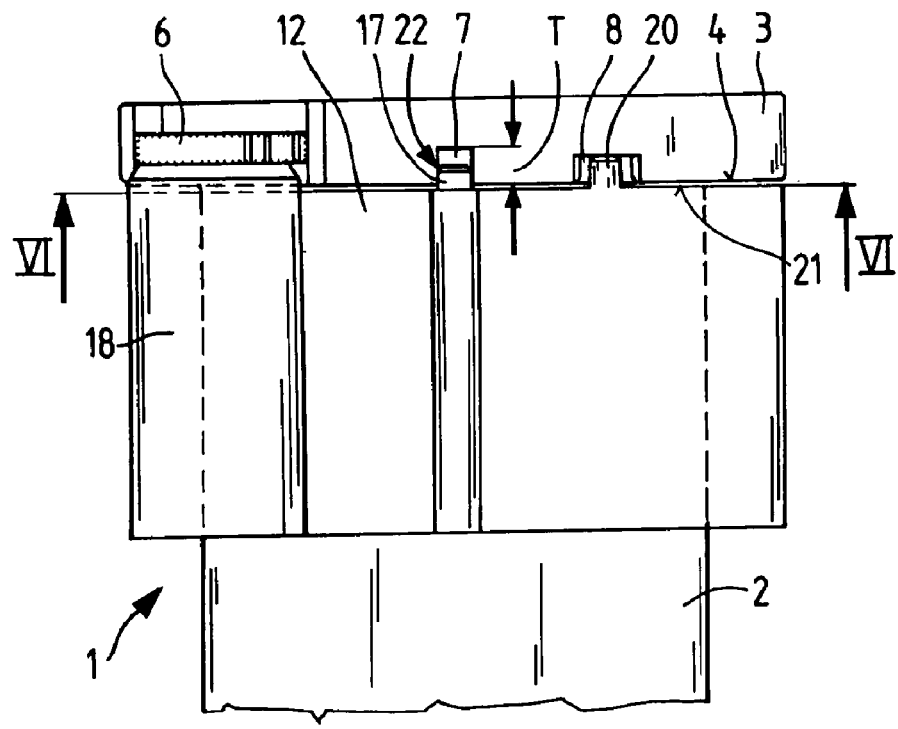
FIG. 5 a view of the flange according to FIG. 4 with mounted air mass meter.
Figure 6:
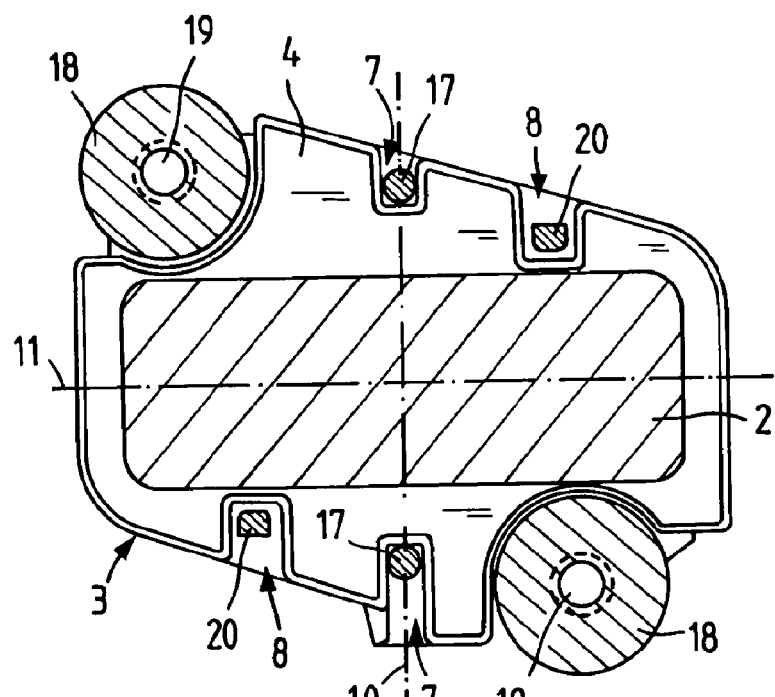
FIG. 6 a section along the line VI-VI in FIG. 5.

FIG. 5 shows an air mass meter inserted into the receiving opening on the flange 5 whose socket 3 rests against the flange 12. FIG. 6 shows a section along line VI-VI in FIG. 5. FIG. 5 shows that the tab 6 is located immediately above the socket element 18. The centering pin 17 engages the centering opening 7, and FIG. 5 shows clearly that the depth T of the centering opening 7 is significantly greater than the height H shown in FIG. 4 by which the centering pin 17 projects past the plane 21 of the flange 12. For setting the insertion depth of the air mess meter 1 in the flow channel, the pin 20 is provided that contacts the bottom of the recess 8 and thus limits the insertion depth.

FIG. 6 shows clearly that the pins 20 have significant play relative to the circumferential contour of the recesses 8 so that jamming of the pins 20 in the recesses 8 is prevented. On the other hand, the size of the centering pins 17, i.e. in regard to its diameter, relative to the width of the centering opening 7, and relative to the inner ends, provides a precise fit so that in the direction of the longitudinal axis 11 and the transverse axis 10 (compare FIGS. 2 and 3) the centering pins 17 are secured free of play in the centering openings 7. By means of this arrangement of the centering pins 17 and centering openings 7 an extremely precise alignment of the air mass meter or the sensor housing 2 relative to the flow direction of the fluid flow guided in the flow channel is provided.

Figure 7:
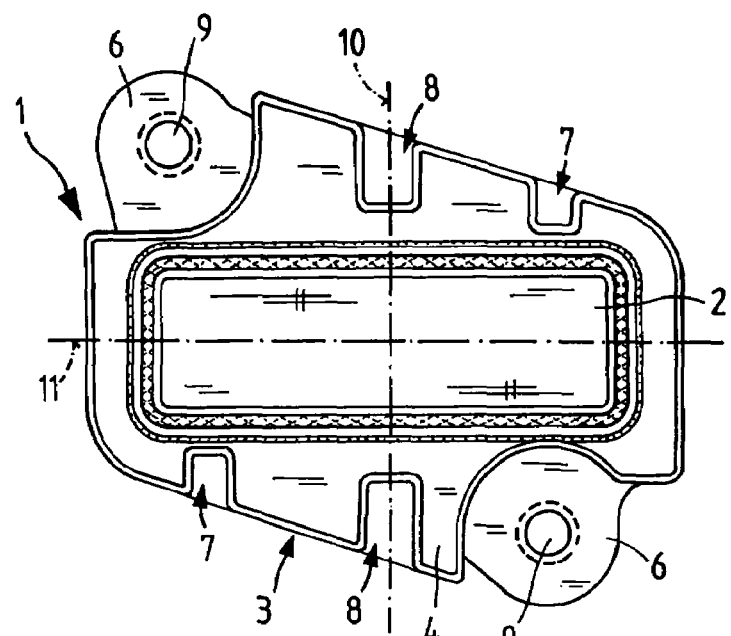
FIG. 7 a variant of the embodiment of FIG. 2.

FIG. 7 shows a variant of the embodiment of FIG. 2 wherein the difference resides in that the centering openings 7 are arranged at a significant spacing relative to the transverse axis 10 and the recesses 8 are positioned in the area of the transverse axis 10. In regard to all other parts the arrangements and reference numerals are identical to those of FIG. 2.

Figure 8:
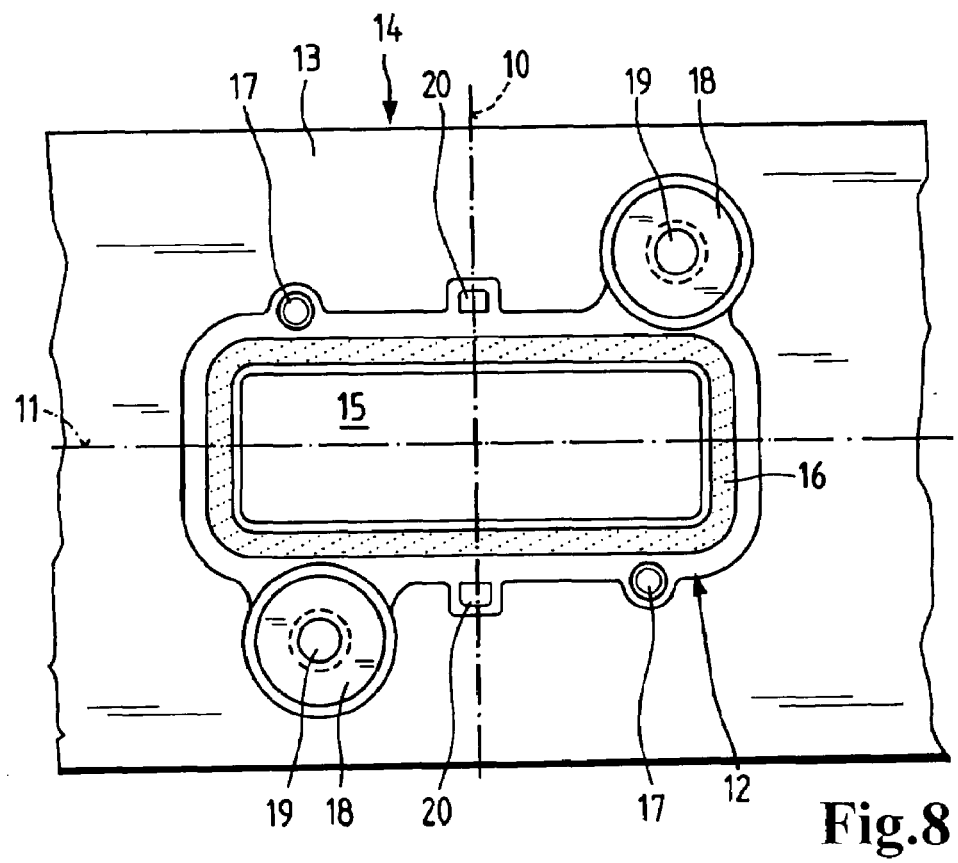
FIG. 8 a variant of the embodiment of FIG. 3.

In FIG. 8 the arrangement of the centering pins 17 is appropriately selected such that their position is matched to the centering openings 7 in FIG. 7, i.e., the spacing of the centering pins 17 from the transverse axis 10 corresponds to that of the centering openings 7. The pins 20 are provided in the area of the transverse axis 10 and thus fit into the recesses 8. In other respects, the reference numerals and illustrations correspond to that of FIG. 3.

Figure 9:
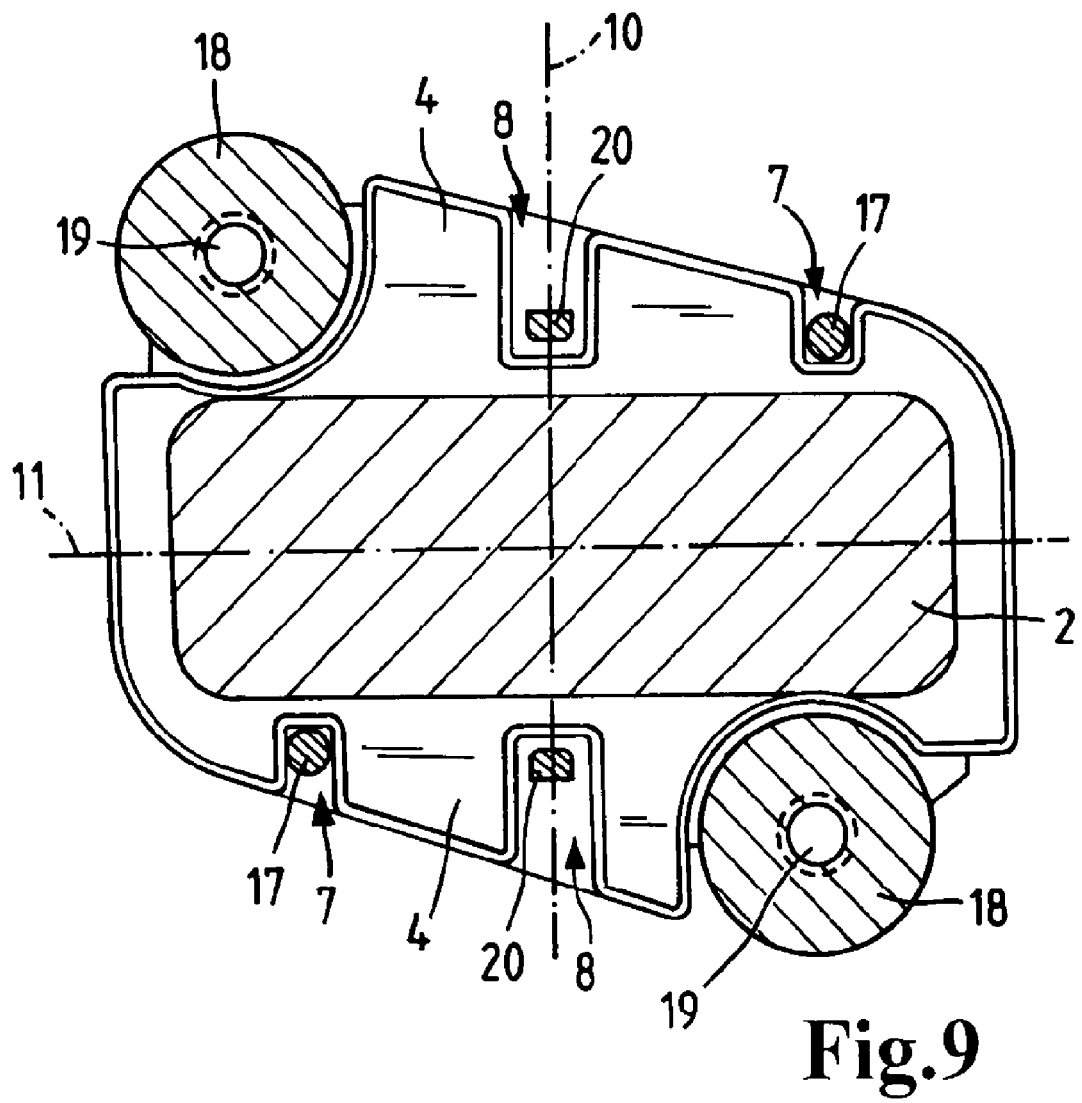
FIG. 9 a variant of the embodiment of FIG. 6.

FIG. 9 shows a section of the arrangement as shown in FIG. 6 but with the position of the centering openings 7 and centering pins 17 as shown in FIGS. 7 and 8. As a result of the relatively large spacings of the centering openings 7 and centering pins 17 from the transverse axis 10 an even greater positioning precision of the air mass meter 2 is achieved.

What is claimed is:

1. An arrangement comprising an air mass meter and a flow channel, wherein the flow channel has a housing section comprising a flange surrounding a receiving opening for the air mass meter, wherein the air mass meter comprises a socket with a contact surface that is facing the flange, the arrangement further comprising fastening means that attach the socket on the housing section, wherein the socket and the housing section have means for positioning the air mass meter free of play relative to a flow direction of a fluid flow that is guided in the flow channel, wherein the means for positioning free of play comprise at least two centering pins each engaging a centering opening of precise fit, wherein a height by which said at least two centering pins project past a plane of the flange is smaller than a depth of said centering opening, and wherein on the flange an additional pin is provided for each one of said at least two centering pins and spaced at a distance from said at least two centering pins, respectively, wherein said additional pins contact a bottom of a recess of the socket, respectively.

2. The arrangement according to claim 1, wherein said at least two centering pins are monolithically formed on the flange at an outer edge of the flange.

3. The arrangement according to claim 1, wherein said centering opening is formed on the contact surface of the socket.

4. The arrangement according to claim 3, wherein said centering opening is a groove beginning at an outer edge of the contact surface.

5. The arrangement according to claim 1, wherein said at least two centering pins each have a leading end provided with an insertion cone.

6. The arrangement according to claim 1, wherein the receiving opening or the flange has an elongate shape and said at least two centering pins are located at least approximately at a center of a longitudinal extension of said elongate shape.

7. The arrangement according to claim 1, wherein the receiving opening or the flange has an elongate shape and said at least two centering pins are arranged at a significant spacing relative to a transverse axis of said elongate shape, wherein the transverse axis defines a center of a longitudinal extension of said elongate shape.

8. The arrangement according to claim 1, wherein the additional pins and the recesses provide means for precise determination of an insertion depth of the air mass meter into the flow channel.

9. The arrangement according to claim 1, wherein the additional pins have significant play relative to a circumferential contour of the recesses, respectively.

10. An arrangement comprising:

an air mass meter and a flow channel;

wherein the flow channel has a housing section comprising a flange surrounding a receiving opening for the air mass meter;

wherein the air mass meter comprises a socket with a contact surface that is facing the flange, the arrangement further comprising fastening means that attach the socket on the housing section;

wherein the socket and the housing section have means for positioning the air mass meter free of play relative to a flow direction of a fluid flow that is guided in the flow channel;

wherein the means for positioning free of play comprise at least two centering pins each engaging a centering opening of precise fit;

wherein a height by which said at least two centering pins project past a plane of the flange is smaller than a depth of said centering opening;

wherein on the flange an additional pin is provided for each one of said at least two centering pins and spaced at a distance from said at least two centering pins, respectively;

wherein the additional pins and the recesses provide means for precise determination of an insertion depth of the air mass meter into the flow channel, wherein said additional pins contact a bottom of the recess of the socket, respectively, and thus limit the insertion depth of the air mass meter into the flow channel.

* * * * *